(12) United States Patent
El-Ghoroury et al.

(10) Patent No.: US 8,098,265 B2
(45) Date of Patent: Jan. 17, 2012

(54) HIERARCHICAL MULTICOLOR PRIMARIES TEMPORAL MULTIPLEXING SYSTEM

(75) Inventors: Hussein S. El-Ghoroury, Carlsbad, CA (US); Aditi Majumder, Irvine, CA (US); Robert G. W. Brown, Tustin, CA (US); Andrew J. Lanzone, San Marcos, CA (US)

(73) Assignee: Ostendo Technologies, Inc., Carlsbad, CA (US)

( * ) Notice: Subject to any disclaimer, the term of this patent is extended or adjusted under 35 U.S.C. 154(b) by 741 days.

(21) Appl. No.: 12/249,695

(22) Filed: Oct. 10, 2008

(65) Prior Publication Data

US 2010/0091050 A1   Apr. 15, 2010

(51) Int. Cl.
G09G 5/10 (2006.01)
(52) U.S. Cl. ........ 345/691; 345/690; 345/694; 345/589; 345/590; 348/742; 348/743; 348/744
(58) Field of Classification Search .................... 345/83, 345/88, 89, 589, 605, 690–691; 348/742–744
See application file for complete search history.

(56) References Cited

U.S. PATENT DOCUMENTS

| | | | |
|---|---|---|---|
| 4,596,992 A | 6/1986 | Hornbeck | |
| 5,280,277 A | 1/1994 | Hornbeck | |
| 5,526,063 A | 6/1996 | Joubert et al. | |
| 5,535,047 A | 7/1996 | Hornbeck | |
| 6,342,897 B1 | 1/2002 | Wen | |
| 6,769,772 B2 | 8/2004 | Roddy et al. | |
| 6,910,777 B2 | 6/2005 | Ito | |
| 7,101,049 B2 | 9/2006 | Shindoh | |
| 7,210,806 B2 | 5/2007 | Holman et al. | |
| 7,334,901 B2 | 2/2008 | El-Ghoroury | |
| 2004/0036668 A1 | 2/2004 | Nakanishi | |
| 2007/0058087 A1* | 3/2007 | Kettle et al. | 348/742 |
| 2007/0064007 A1* | 3/2007 | Childers et al. | 345/589 |
| 2007/0064008 A1* | 3/2007 | Childers | 345/589 |
| 2008/0204382 A1 | 8/2008 | Lim et al. | |

FOREIGN PATENT DOCUMENTS

WO   WO-2006/089041   8/2006

OTHER PUBLICATIONS

"International Search Report and Written Opinion of the International Searching Authority Dated Dec. 30, 2009", International Application No. PCT/US2009/060071.
Jansen, Michael, et al., "Visible Laser and Laser Array Sources for Projection Displays", *Proc. of SPIE* vol. 6135, (2006).

* cited by examiner

*Primary Examiner* — Richard Hjerpe
*Assistant Examiner* — Sahlu Okebato
(74) *Attorney, Agent, or Firm* — Blakely Sokoloff Taylor & Zafman LLP

(57) ABSTRACT

This invention describes an apparatus, methods and a system for high speed hierarchical multiplexing the native color primaries of SSL-based display systems in order to improve color quality and stability as well as brightness and the efficiency of the display system.

30 Claims, 4 Drawing Sheets

HIERARCHICAL MULTICOLOR PRIMARIES TEMPORAL MULTIPLEXING SYSTEM

BACKGROUND OF THE INVENTION

1. Field of the Invention

The present invention relates to the field of display systems, and more particularly solid state light source based display systems having a native gamut that are to display images from image data having a target gamut.

2. Prior Art

FIG. 1a illustrates a typical spatially modulated projection system. Central to most spatially modulated color projection systems (see "Projection Displays,", E. H. Stupp et al., John Wiley and Sons Ltd., 1999), such as micro mirror or liquid crystal cells on silicon (LCOS) projectors, is a light pipe, which includes a white light lamp 110 and a color wheel 120. The color wheel 120 usually contains three different types of filters for selectively passing spectrums of red, green and blue {R, G, B} primaries. More recently, the color wheel also provides a fourth clear filter which is used selectively to reproduce a predefined set of colors, especially for grays (see U.S. Pat. No. 6,910,777). This four color primary system resembles the CMYK color system of printers and leads to higher brightness and contrast specifications. This concept has been generalized to provide five or more primaries to enhance the reproduced color gamut (see U.S. Pat. Nos. 5,526,063 and 6,769,772).

However, in all these display systems, at any particular instance of time, only one of the color primaries; e.g. red, green or blue, can be turned on. Hence, the color properties of the display system are dictated completely by the chrominance and luminance properties of the color filters used in the color wheel 120 (see "Visible Laser and Laser Array Sources for Projection Displays", Jansen et al., Proc. of SPIE Vol. 6135, 2006). For example, the color gamut of a display system cannot be changed to match a predefined standard gamut. As a result, the display device performance depends heavily on the quality of the color primaries filters used on the color wheel 120 and how close these primaries, in terms of their chrominance, to the predefined standards or target gamut color primaries. This can be a severe restriction especially since the number of standards are defined and redefined at a much faster rate today.

More recently, the projection industry, like any other display industry, has been driven to produce compact, low-power, high-longevity projectors without sacrificing the display quality. This saw the advent of projectors illuminated by solid state light (SSL) sources, such as light emitting diodes (LED) and laser diode (LD) (see U.S. Pat. Nos. 7,101,049 and 7,334,901, the disclosure of which is hereby incorporated by reference). SSL sources can provide bright and saturated colors with orders of magnitude higher longevity. FIG. 1b illustrates a spatially modulated projection system that uses SSL sources 140. Each of the color primaries in the light pipe of the projection system illustrated in FIG. 1b is generated by a SSL 140 comprised of a single or array of SSL devices of a specific color (see U.S. Pat. Nos. 7,101,049, 7,210,806 and 7,334,901 and "Visible Laser and Laser Array Sources for Projection Displays", Jansen et al., Proc. of SPIE Vol. 6135, 2006). Furthermore, since multiple primaries are provided by multiple light sources, the light pipe does not need include any color wheel. The most important feature of the projection system architecture illustrated in FIG. 1b in the context of this invention is that, unlike projectors with a light bulb and color wheel, in projectors with multiple SSL such as the projection system architecture illustrated in FIG. 1b, more than one color primary can be turned on simultaneously as described in prior art (see U.S. Pat. No. 7,334,901). Furthermore, unlike the arc lamps used in most common projection systems such as that illustrated in FIG. 1a, which typically require several tens of seconds to be turned on, SSL can be switched on and off in much less than a microsecond.

In conventional spatially modulated projectors, such as illustrated in FIG. 1a, since the color properties of the display are completely dictated by the physical properties of the color filters, color properties can be manipulated only in a limited fashion. For example, matching the display system color gamut to predefined standards, such as NTSC 210 or HDTV 220 illustrated in FIG. 2 (which shows various color gamut plotted in (u',v') chromaticity color space), white point, or brightness are important performance parameters for any projection-based product in the display market. However, the color gamut generated by conventional spatially modulated projectors, such as illustrated in FIG. 1a, is defined by the chromaticity coordinates of its red, green and blue filters and cannot be changed without changing the color filters 120 or the light bulb 110. Typically the white point of conventional spatially modulated projectors, such as illustrated in FIG. 1a, can be changed only in a limited manner by biasing the displayed image pixels grayscale values of each of the color primaries at the cost of reduced contrast, dynamic range, wall-plug efficiency, and overall achieved brightness. Furthermore, often the controls to change these properties are not independent of each other, resulting in a very difficult calibration procedure which would suffer from convergence problems, especially if multiple properties, such as brightness and white point, are being optimized together.

In order to assure display system compliance with color property standards parameters (such as color gamut, brightness and white point), the display industry has to follow strict quality measures when manufacturing the light sources 110 and color filters 120. For example, if the color gamut resulting from the color filters 120 does not cover the NTSC gamut 210, sophisticated gamut mapping methods need to be instrumented and still may not provide the required visual quality when a wider color gamut light sources such SSL sources 140 are used as illustrated in FIG. 2. As illustrated in FIG. 2, the color gamuts 250 and 260 provided by SSL sources 140 are typically much wider than typical commercial display systems color gamuts, such as NTSC 210 or HDTV 220. When the native gamut of the display system is much wider than the target gamut, such as when the SSL based projection display system architecture illustrated in FIG. 1b, is used targeting commercial display color gamut such as NTSC 210 and HDTV 220, special color mapping techniques are instrumented to limit the native gamut of the display system to the target gamut. Besides wasting the potentially higher luminous flux offered by the typical wider gamut 250 and 260 of the SSL sources, these techniques are often severely non-linear and often need a custom fit to each particular SSL device.

The hierarchical multicolor primaries multiplexing system of this invention make use of the capability of multiple color primaries on-cycles simultaneity offered by SSL-based projection display system (see U.S. Pat. No. 7,334,901) to remove all these rigidities. Using the hierarchical color primaries multiplexing system of this invention, a display system that confirms to standard target gamut, white point and brightness can be easily provided for a wide variety of SSL sources which may not strictly adhere to the predefined standards. Furthermore, the hierarchical color primaries multiplexing system of this invention can also be used to maximizing the display system capabilities, in particular brightness and wall-plug efficiency, while completely adhering to the required target gamut and white point specifications.

Central to many projection display systems is the spatial light modulator (SLM), such as the micro mirror and LCOS devices (see U.S. Pat. Nos. 5,535,047 and 4,596,992). In such projection systems, such as those illustrated in FIGS. 1a and 1b, that uses a reflective type SLM device, such a micro mirror or LCOS devices, the reflective state of each of the SLM device pixels can be set digitally based on the desired on/off state of each of the pixels forming the digital image. The projection image is formed by sequentially modulating each of the display system color primaries spatially using the SLM device with the image pixels grayscale data of each color primary. The pixel grayscale data for each color primary, which is typically expressed as multiple bit words, is typically converted into serial bit stream using pulse width modulation (PWM) technique. The PWM bits are used to set the SLM device pixel on/off state. Typically the digital image data associated with each color primary are modulated by the SLM device sequentially in a temporal multiplexing fashion. This temporal multiplexing of each of the primaries in conjunction with PWM technique is used to create spatial modulation 1-bit planes for each color primary which are loaded into the SLM device to set the on/off state of each of its pixel to express the different grayscale value of each image pixel color primary (see U.S. Pat. No. 5,280,277). However, when SSL sources are used, such as in the architecture illustrated in FIG. 1b, the color primaries generated by the SSL source would typically have different chromaticity characteristics than the color gamut required for most commercial display systems as illustrated in FIG. 2. As a result the conventional temporal multiplexing of the native color primaries (meaning the native color primaries generated by the SSL devices) of the display systems cannot be used. Furthermore, as explained earlier, the color gamut mapping schemes currently used in SSL-based projection systems are inflexible and inefficient. The objective of this invention is, therefore, to describe a hierarchical multicolor temporal multiplexing system that can be used in SSL-based projection systems to improve color quality and stability as well as the efficiency of the display system.

BRIEF DESCRIPTION OF THE DRAWINGS

The invention is illustrated by way of example, and not by way of limitation, in the figures of the accompanying drawings in which like reference numerals refer to similar elements.

DETAILED DESCRIPTION OF THE PREFERRED EMBODIMENTS

Figure 1A:
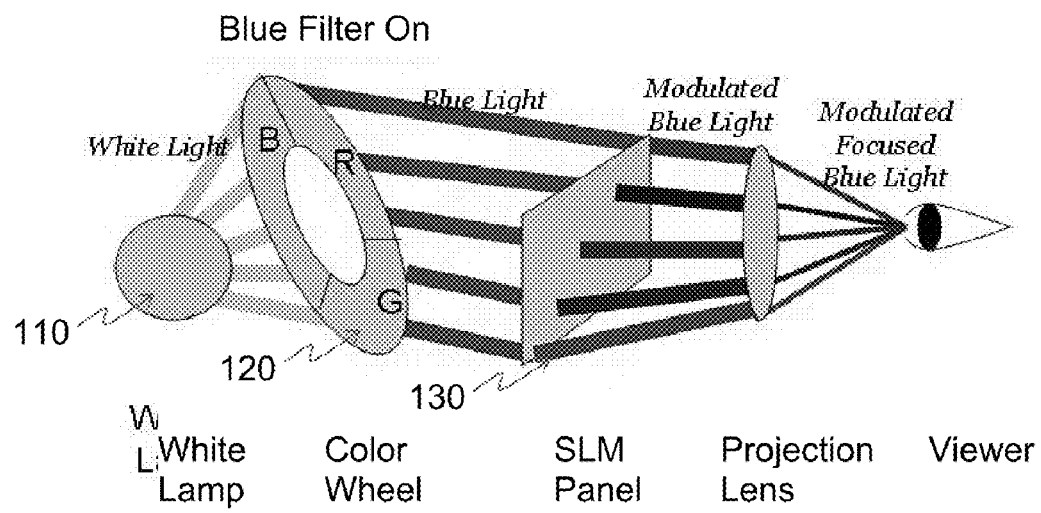
FIG. 1a illustrates the light path of a color wheel based SLM projector.

The preferred embodiments of the present invention provides apparatus, methods and a system for hierarchically multiplexing the native color primaries of SSL-based display systems in order to improve color quality and stability as well as the efficiency of the display system. This objective is attained by taking advantage of the high-speed on/off switching capabilities of the SSL device and the possible on-cycles simultaneity of the different SSL primaries by hierarchically multiplexing the native color primaries of SSL devices to synthesize new set of color primaries then temporally multiplexing the newly synthesized color primaries to create the spatial color fields that would be modulated by the SLM device to create the projections image. In the first level of the hierarchy the SSL devices native primaries are simultaneously temporally multiplexed to allocate the appropriate proportion of the different SSL native primaries to create a synthesized set of color primaries. Each of the synthesized color primaries is hence generated by the high-speed simultaneous temporally multiplexed patterns of the SSL native color primaries. In the second level of the hierarchy, each of these simultaneous multiplexed patterns is considered as a single temporal multiplexing block of the SSL native color primaries that signify a newly synthesized color primary. These simultaneous temporal multiplexing blocks of the SSL native color primaries are then further temporally multiplexed together to create a particular white point relative to which grayscale values of the digital image pixels would be represented using the synthesized color primary. The temporal multiplexing block of the SSL native color primaries thus created in the second level can then be scaled in the third level of the hierarchy to take advantage of the increased luminous flux due to the simultaneity of the native SSL primaries to increase the brightness of the display system.

Additional objectives and advantages of various aspects of this invention will become apparent from the following detailed description of a preferred embodiment thereof that proceeds with reference to the accompanying drawings. In that regard, references in the following detailed description of the present invention to "one embodiment" or "an embodiment" means that a particular feature, structure, or characteristics described in connection with the embodiment is included in at least one embodiment of the invention. The appearances of the phrase "in one embodiment" in various places in this detailed description are not necessarily all referring to the same embodiment.

A hierarchical multicolor primaries temporal multiplexing system for use in SSL-based projection display systems is described herein. In the following description, for the purpose of explanation, numerous specific details are set forth in order to provide a thorough understanding of the invention. It will be apparent, however, to one skilled in the art that the invention can be practiced with different specific details. In other instance, structures and devices are shown block diagram form in order to avoid obscuring the invention.

Figure 3:
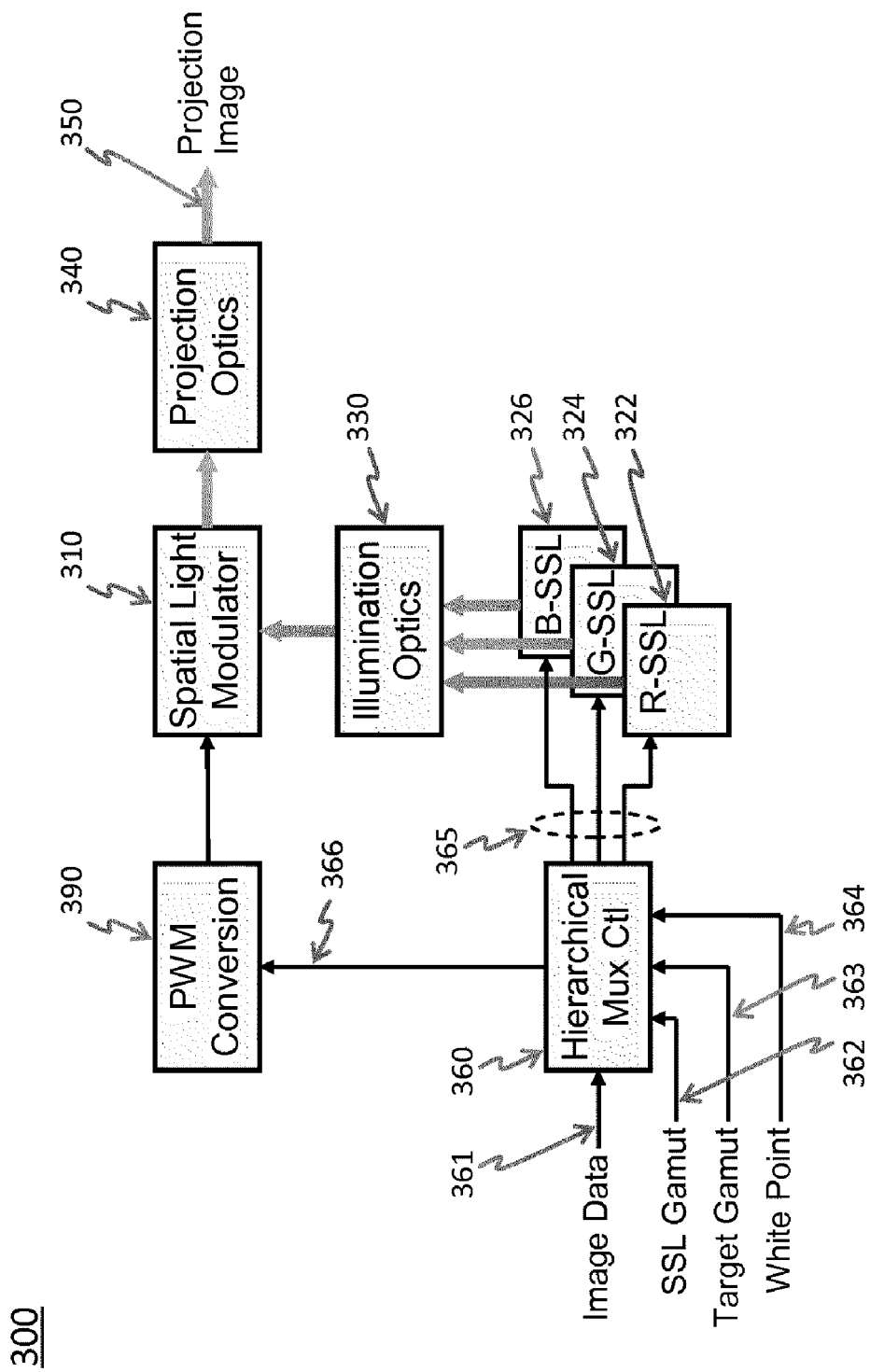
FIG. 3 illustrates a block diagram of the SSL based SLM projector incorporating hierarchical temporal multiplexing of this invention.

The hierarchical multicolor primaries temporal multiplexing system described herein is illustrated in FIG. 3 in the form of a functional block diagram within the context of a projection display system. Similar to the SSL-based projection system illustrated in FIG. 1b, the projection system 300 incorporating the hierarchical multicolor primaries temporal multiplexing system of this invention comprises a SLM device 310 which is illuminated by a set of SSL devices 322, 324 and 326 each providing one of the native color primaries of the projection system 300. The light generated by set of SSL devices 322, 324 and 326 is collimated, combined then relayed and coupled onto the optical surface of the SLM device 310 by the illumination optics 330. The coupled light is then spatially modulated by the SLM device 310 and then magnified to form the display projection image 350 by the projection optics 340. Central to the operation of the projection system 300, incorporating the hierarchical multicolor primaries temporal multiplexing system of this invention, is the hierarchical multiplexing functional block 360 which generates the high-speed on/off signals 365 that controls the on/off duty cycle of the SSL devices 322, 324 and 326 and provides the PWM modulation function block 390 with display image data expressed in the synthesized color primaries. The PWM modulation function block 390 converts the display image data provided by the hierarchical multiplexing functional block 360 into spatial modulation 1-bit planes which are then coupled into the SLM device 310 to control the on-state of each of its pixels.

Figure 2:
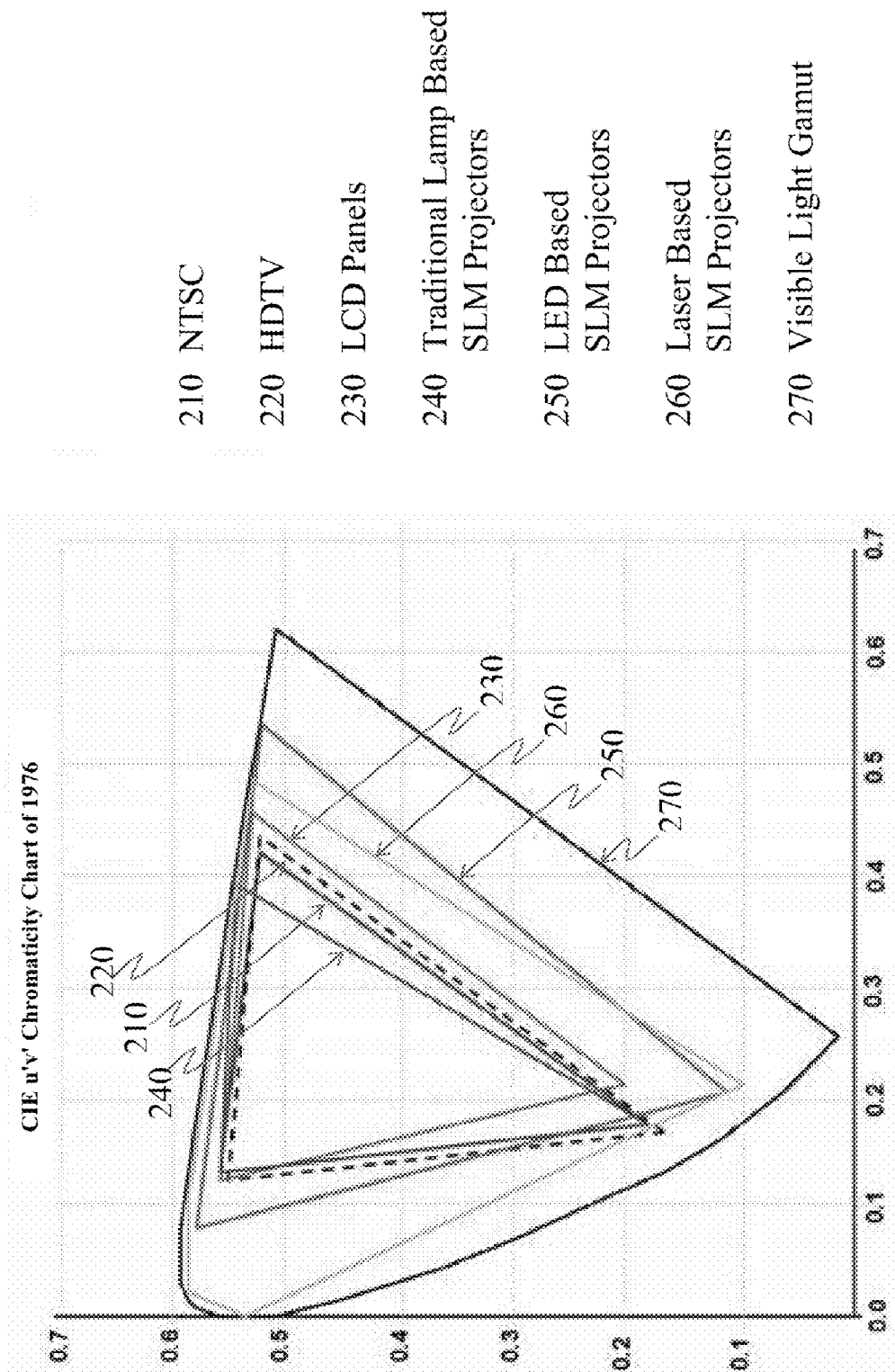
FIG. 2 illustrates the typical target gamuts in relation to the color gamut capabilities of SSL devices.
Figure 4:
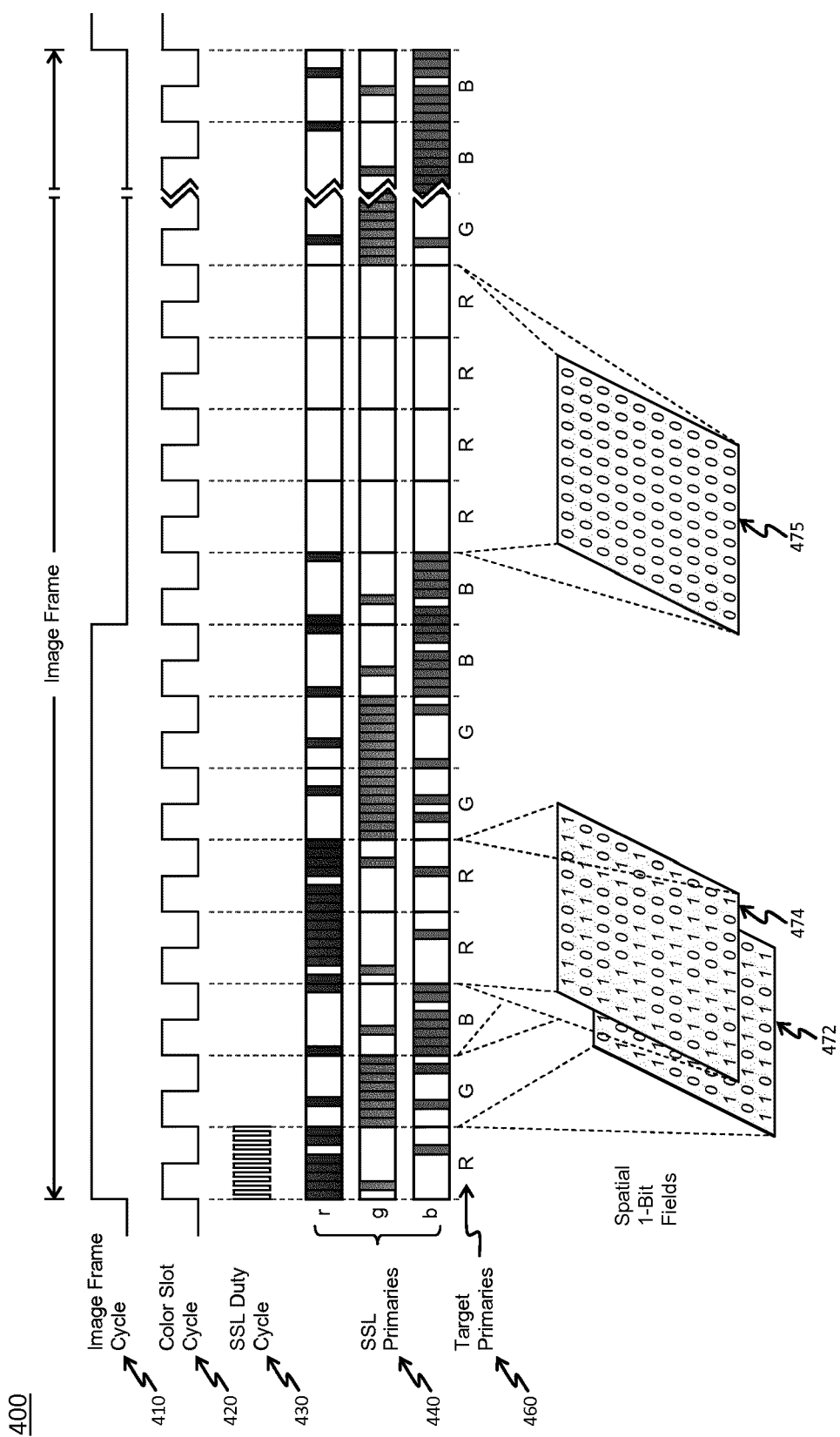
FIG. 4 illustrates the operational timelines of the SSL based SLM projector incorporating hierarchical temporal multiplexing of this invention.

The timeline of the operation of the hierarchical multiplexing functional block 360 is illustrated in FIG. 4. The image data expressed in terms of the target gamut color primaries, such as NTSC 210 or HDTV 220 illustrated in FIG. 2, would be provided to the hierarchical multiplexing functional block 360 as an image data input 361 which would typically incorporate an image frame cycle signal plus a multiplicity of multiple bit words each expressing the grayscale value for each of the color primaries of the target gamut. Also provided to the hierarchical multiplexing functional block 360 as one time input are digital inputs 362 and 363 which specify the color coordinates, in either (u',v') or (x,y) color space, of the SSL devices 322, 324 and 326, and the color coordinates of the target gamut color primaries; respectively. Based on the values of the digital inputs 362 and 363, the hierarchical multiplexing functional block 360 would compute the simultaneous duty cycle of each of the SSL devices 322, 324 and 326 needed to synthesize the target gamut color primaries as specified by the external input 363. The computed simultaneous duty cycles of the SSL devices 322, 324 and 326 represent the level of SSL devices simultaneity required to synthesize the target gamut color primaries. The computed simultaneous duty cycles are used to create the timing signal 365 which is provided to the SSL devices 322, 324 and 326 to control the simultaneous duty cycle operation of each of the SSL devices 322, 324 and 326 during each of the synthesized color slot cycles 420 illustrated in FIG. 4.

Referring FIG. 4, the image frame 410, which in most display systems would be operating at either 60 Hz or 120 Hz, would typically be divided into the synthesized color slot cycles 420, which represent the time duration during which the spatial modulation 1-bit fields would be loaded into the SLM device 310. Typically the number of synthesized color slot cycles 420 within the duration of the image frame 410 would equal to the number of synthesized primaries multiplied by the number of PWM bits ($2^N-1$), where N denotes the number of bits comprising each of the multiple bit words representing the image pixels grayscale values. Most digital image data is formatted using a target gamut expressed in three color primaries, such as NTSC 210 of HDTV 220 illustrated in FIG. 2, with image pixels grayscale values expressed in 8-bit words, which would make the typical image frame cycle 420 illustrated in FIG. 4 be comprised of 765 color slot cycles 420. For example, when the projection system 300 incorporating the hierarchical multicolor primaries temporal multiplexing of this invention is operating at 60 Hz image frame cycle 420, the typical duration of the synthesized color slot cycles 420 would be approximately 21.8 microseconds. A person skilled in arts would know how to derive the design parameters of the image frame cycle 420 for a display system 300 that uses larger number of color primaries, higher image frame cycle rate and/or higher number of bits representing the image pixels grayscale values.

Referring to FIG. 4, the synthesized color slot cycles 420 are further divided into multiplicity of SSL duty cycle 430, wherein the later represents the SSL devices 322, 324 and 326 on/off state duration. The number of SSL duty cycles 430 within each color slot cycle 420 is determined by the degree of precision required in synthesizing the target gamut color primaries 460 using the native color primaries 440 of the SSL devices 322, 324 and 326 and upper bounded by the maximum value of on/off switching speed of the SSL devices 322, 324 and 326. For example, if the maximum value of on/off switching speed of the SSL devices 322, 324 and 326 is 1-MHz; which is equivalent to a minimum SSL duty cycles 430 of one microsecond, then the synthesized color slot cycles 420 can incorporate a maximum number of 21 SSL duty cycles 430, which would allow the ability to express the synthesizing the target gamut color primaries 460 with less than 2.4% accuracy using the native color primaries 440 of the SSL devices 322, 324 and 326. In practice in order to facilitate the digital logic implementation of the hierarchical multiplexing functional block 360, the number of SSL duty cycles 430 would be in the order of $2^n$ and, the case of the previous example, the number of SSL duty cycles 430 within each color slot cycle 420 would 16 cycles.

Although the illustration of FIG. 4 shows the timeline for the operation of the hierarchical multiplexing functional block 360 when three SSL color primaries are used to synthesize three target gamut color primaries, the principal of operation the hierarchical multiplexing functional block 360 is equally applicable when more than three SSL color primaries are used and could also be used to synthesize more than three target gamut color primaries. The most important aspect for the operation of the hierarchical multiplexing functional block 360 is that the target gamut color primaries would have to be fully contained within the gamut formed by the SSL color primaries. For example, of particular interest in several applications is the use of multiple color primaries besides red, green and blue such as cyan (C), yellow (Y), magenta (M) and also to add white (K) as a color primary in order to adjust the saturation level of the principal color primaries, all of which may be done with an embodiment of the hierarchical multiplexing functional block 360. In this case example, the target primary would be synthesized by adjusting the simultaneous duty cycles of SSL devices 322, 324 and 326; for example, the synthesized C-primary slot would incorporate minimal green SSL primary contribution and similarly the synthesized K-primary slot would incorporate appropriate simultaneous contribution from all three of the SSL devices 322, 324 and 326 required to generate the required white for the K-primary.

In addition to generating the control signal 365 that governs the temporal multiplexing and simultaneous operation of the SSL devices 322, 324 and 326, in one embodiment the projection system 300 incorporating the hierarchical multicolor primaries temporal multiplexing of this invention, the hierarchical multiplexing functional block 360 also synchronizes the operation of the SSL devices 322, 324 and 326 with the operation of the PWM conversion functional block 390. Specifically, the hierarchical multiplexing functional block 360 would provide the PWM conversion functional block 390 with the input 366 which incorporate; (1) a SYNC signal that represents the timing of the color slot cycles 420; (2) for each pixel of the digital image, the 1-bit value (1-bit plane) of each bit of the grayscale multiple bit word for each synthesized target gamut color primary; and (3) the number of the color slot cycles 420 allocated for that 1-bit plane. In one embodiment of the hierarchical multiplexing functional block 360, the input 366 representing the n-th significant bit of a multiple bit grayscale value of a specific color primary would incorporate the 1-bit value, either 0 or 1, of that bit for each of the digital image pixels plus an allocation of $2^n$ color slot cycles

420 (a digital control word specifying the number of color slot cycles to apply the conveyed image pixel on/off state 1-bit fields to control the reflective states of each of the pixels). In response to the input 366, the PWM functional block 390 would synchronously relay the 1-bit field values outputted by the hierarchical multiplexing functional block 360 to the SLM device 310 during the designated number of the color slot cycles 420 durations.

The 1-bit planes associated with the least two significant bits of the grayscale multiple bit word of the synthesized target gamut green (G) primary is illustrated in FIG. 4 as 472 and 474; respectively. As illustrated in FIG. 4, the least significant bit of the grayscale value would require one of the color slot cycles 420 during which the hierarchical multiplexing functional block 360 would allocate and command the appropriate number of duty cycles 430 to each of the SSL devices 322, 324 and 326 required in order to synthesize the target gamut G-primary and output these values to the SSL devices 322, 324 and 326 via the interface signal 365 and would simultaneously output the 1-bit field values 472, illustrated in FIG. 4, associated with a command to the PWM functional block 390 to synchronously relay the outputted 1-bit field values to the SLM device 310 during the designated number of the color slot cycles 420 durations, which in this case would equal to only one color slot cycles 420 duration. FIG. 4 also illustrates the example case of the second least significant bit of the grayscale multiple bit word of the synthesized target gamut red (R) primary in which case the hierarchical multiplexing functional block 360 would allocate and command the appropriate number of duty cycles 420 to each of the SSL devices 322, 324 and 326 required in order to synthesize the target gamut R-primary and output these values to the SSL devices 322, 324 and 326 via the interface signal 365 and would simultaneously output the 1-bit field values 474, illustrated in FIG. 4, associated with a command to the PWM functional block 390 to synchronously relay the outputted 1-bit field values to the SLM device 310 during the designated number of the color slot cycles 420 durations, which in this case would equal to two color slot cycles 420 durations. A person skilled in the arts would know how to implement the specifications outlined in the above examples for higher significant bits of the grayscale values for each of the target gamut color primaries.

Figure 1B:
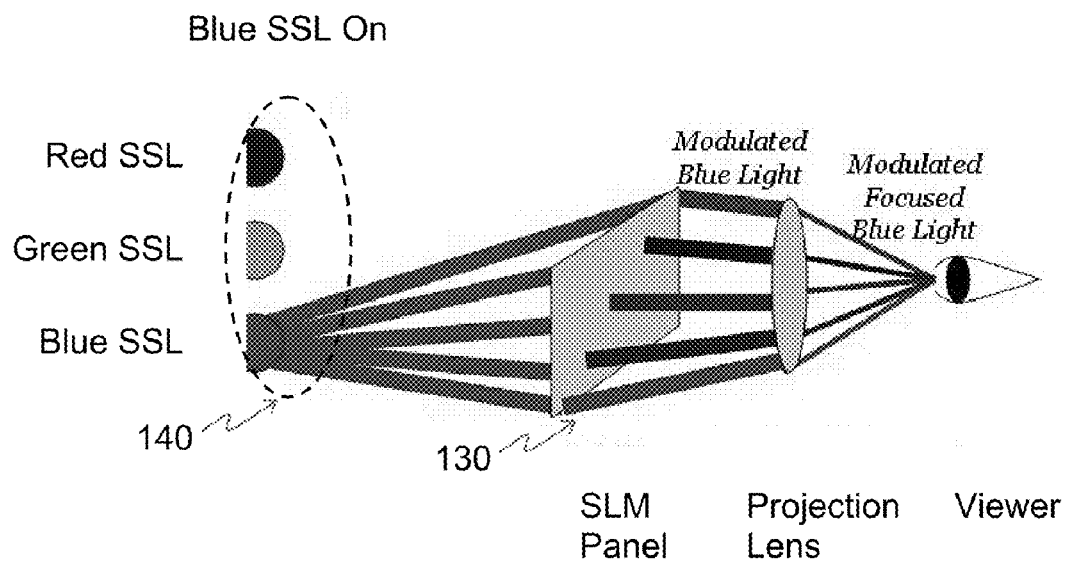
FIG. 1b illustrates the light path of a SSL based SLM projector.

In another embodiment the projection system 300 of this invention the hierarchical multiplexing functional block 360 would incorporate means to reduce possible temporal speckle that could be caused by clustering the color slot cycles 420 allocated to higher significance bits of the pixel grayscale values. In current projection display systems that uses color wheels, such as illustrated in FIG. 1a, the 1-bit planes for a specific color primary are typically clustered within the time duration of the that color filter, which often causes noticeable projection image speckle and artifacts especially in high brightness images. This type of image speckle is typically caused by the temporal multiplexing aspects of the color sequential nature associated with the color wheel and the clustering of the 1-bit planes associated with the grayscale bits of each color primary. In this embodiment the projection system 300 of this invention incorporating the hierarchical multiplexing functional block 360 would avoid this type of color slot clustering by allocating a maximum number of contiguous color slot cycles 420 to each color primary and would also temporally interleave the allocated color slot cycles 420 to prevent excessive contiguity of the color slot cycles 420 allocated to the same synthesized color primary. For example, when the maximum number of contiguous color slot cycles 420 is limited to 16-slots, the hierarchical multiplexing functional block 360 would divide the number of color slot cycles 420 required for grayscale word bits higher than the $4^{th}$ least significant bit into clusters of 16-slots and then the interleave the clusters of 16-slots of the different synthesized color primaries 460 such that the resultant allocation for any single synthesized color primary is not larger than 16-slots. In this example the hierarchical multiplexing functional block 360 would allocate to all of the grayscale word bits up to the $4^{th}$ least significant bit the number of color slot cycles 420 based on the criteria discussed in earlier paragraph but would allocate for the $5^{th}$ least significant of the grayscale word bits of each synthesized color primary 460 2-groups of 16-slot, for the $6^{th}$ least significant bit of the grayscale word bits of each synthesized color primary 460 4-groups of 16-slot and for the most significant bit of the grayscale word bits of each synthesized color primary 460 8-groups of 16-slot and would then interleave these 16-slot allocation such that the contiguous color slot allocations for each synthesized color primary 460 does not exceed 16-slots. This limiting of the number of the contiguous color slot allocations for each synthesized color primary plus interleaving the allocated the maximum size groups (16-slot in the case of the above example) of the different synthesized color primaries 460 would greatly reduce the temporal image speckle due to the increase in the temporal color uniformity achieved by the increased rate of the synthesized color primaries 460 temporal multiplexing.

In another embodiment the projection system 300 of this invention incorporating the hierarchical multiplexing functional block 360 would, in order to take advantage of the high speed switching capabilities of the SSL devices 322, 324 and 326 to further improve the contrast of the projection system 300, examines the 1-bit fields associated with each of the color slot cycles 420 and would insert a black primary (BLK-primary) during these color slot cycles 420 if all of the 1-bit pixel values of their associated 1-bit field is zero value. This capability is illustrated in FIG. 4 which shows the 4-slots allocated to the synthesized R-primary with the SSL devices 322, 324 and 326 switched off when their associated 1-bit plane 475 contains zero value for all of the image pixels. Without this capability during the 4-slots allocated to the synthesized R-primary the SSL devices 322, 324 and 326 would be turned on (such as in the case of the lamp-based and SSL-based projection systems illustrated in FIGS. 1a and 1b; respectively) at the appropriate duty cycles but all of the SLM device 310 pixels would be in the off-state during this 4-slot duration, which would typically caused the photonic leakage associated with the SLM device 310 to be transmitted through the projection optics on the projection image 350, which would degrade the maximum black level, which would in turn degrade the contrast level of the projection image 350. In effect, the capability of the hierarchical multiplexing functional block 360 to adaptively insert a BLK-primary when the spatial 1-bit field is zero value for all pixels would reduce the level of photonic leakage during this type of 1-bit fields and as a result would substantially improve the display system 300 black level and contrast. In fact this adaptive BLK-primary insertion capability of the hierarchical multiplexing functional block 360 would cause the maximum black level of the display system 300 to be high enough to achieve sequential contrast level that is as high as 100,000:1, a sequential contrast level that can not be achieved by any current projection system.

Having described the functional operation of the projection system 300 incorporating the hierarchical multicolor primaries temporal multiplexing system of this invention, the following discussion provides additional details of the design specifications and operation of its principal function block; namely, the hierarchical multiplexing functional block 360. In order to implement the capabilities outlined in the aforementioned embodiments, the hierarchical multiplexing functional block 360 attains the following properties:

a) Level Independency—In each level of the hierarchy, only one property (for example, color gamut, white point or brightness) of the display system 300 is controlled independently. In Level 1 of the hierarchy, the chrominance mapping from the native gamut of the SSL devices 322, 324 and 326 to the synthesized target gamut color primaries is modified. In Level 2, the white point of the synthesized target gamut is modified. In Level 3, the luminance mapping from the native gamut of the SSL devices 322, 324 and 326 to the synthesized target gamut is modified.

b) Level Invariance—When handling properties at upper levels of the hierarchy, the properties which have been fixed in the lower levels will not be changed. For example, when the white point is changed in Level 2, the color gamut achieved in Level 1 is unchanged.

c) Processing Invariance—The same processing module is used in each level of the hierarchy but with different inputs to impact different properties of the display system 300. Each level includes a temporal modulation and a brightness processing module.

These properties of the hierarchical multiplexing functional block 360 provide the desired linear convergence towards the target parameters (for example target gamut, white point or brightness) and the handling of only one parameter at a time without affecting other parameters, which greatly simplifies the calibration of the display system 300.

Referencing FIG. 3, the processing module of the hierarchical multiplexing functional block 360 utilizes the following parameters, which are represented by the following notations:

(a) $r=(r_x,r_y)$, $g=(g_x,g_y)$ and $b=(b_x,b_y)$ denote the SSL devices 322, 324 and 326 color primaries 440 chromaticity coordinates (input 362);

(b) $L_r$, $L_g$ and $L_b$ denote the SSL devices 322, 324 and 326 full duty cycle brightness (input 362);

(c) $R=(R_x,R_y)$, $G=(G_x,G_y)$ and $B=(B_x,B_y)$ denote the target gamut color primaries 460 chromaticity coordinates (input 364);

(d) $L_R$, $L_G$ and $L_B$ denote the target gamut color primaries 460 required brightness;

(e) $W=(W_x,W_y)$ denotes the chromaticity coordinates of the target white point for the display system 300 (input 364);

(f) $L_W$ denotes the required brightness of the target white point for the display system 300 (input 364); and (g) $\alpha$, $\beta$ and $\gamma$ denote the fraction of the color slot cycles 420 required to be allocated to each of the SSL devices 322, 324 and 326 to achieve the desired target gamut (input 363) and white point brightness (input 364) of the display system 300.

Note that lowercase letters refer to the color of the SSL devices, capital letters refer to synthesized colors, and the brightness for all colors is denoted by L subscripted with the color designation.

Level 0; Calibration and Initialization

The chromaticity coordinates r, g and b and the brightness $L_r$, $L_g$, and $L_b$ of the SSL devices 322, 324 and 326 color primaries 440 (SSL gamut) would be measured during the initial calibration of the display system 300 and would be provided to the hierarchical multiplexing functional block 360 as the input 362 during initialization of the display system 300. Also provided to the hierarchical multiplexing functional block 360 during initialization of the display system 300 are the input 363, which conveys target gamut color primaries chromaticity coordinates R, G and B, and brightness $L_R$, $L_G$, and $L_B$ as well the input 364, which conveys desired white point chromaticity coordinates W and brightness $L_W$. The values of the inputs 362, 363 and 364 would be stored internal to the hierarchical multiplexing functional block 360 during initialization of the display system 300 to be used during subsequent operation.

Level 1 Processing: Gamut Control

Using the externally provided chromaticity coordinates values of the SSL devices 322, 324 and 326 color primaries 440 r, g and b (input 362), the hierarchical multiplexing functional block 360 determines the number of SSL duty cycles 430 $t_r^{R,B,G}$, $t_g^{R,G,B}$ and $t_b^{R,G,B}$ within each color slot cycle 420 that each of the SSL devices 322, 324 and 326 would be turned on to synthesize the target gamut color primaries R, G and B (input 363). The values $t_r^{R,B,G}$, $t_g^{R,G,B}$ and $t_b^{R,G,B}$ for each color slot cycle 420 are determined based on the total number of SSL duty cycles 430 within each color slot cycle 420 and the fraction values $\alpha$, $\beta$ and $\gamma$. For example, if each color slot cycle 420 is comprised of 16 SSL duty cycles 430 and the value of $\alpha_G=0.1875$, which represents the fraction of the color slot cycle 420 allocated to the synthesized green color primary during which the red SSL is turned on in order to synthesize the target gamut green primary, then $t_r^G=3$. In this example if $\beta_G=0.875$, which represents the fraction of the color slot cycle 420 allocated to the synthesized green color primary during which the green SSL is turned on in order to synthesize the target gamut green primary, then $t_g^G=14$. Similarly if in this example $\gamma_G=0.0625$, which represents the fraction of the color slot cycle 420 allocated to the synthesized green color primary during which the blue SSL is turned on in order to synthesize the target gamut green primary, then $t_b^G=1$. Thus in this example the target gamut green (G) primary is synthesized by simultaneously turning on, during the color slot cycle 420 allocated to the synthesized green (G) color primary, the red SSL device 322 during three (3) of the SSL duty cycles 430, the green SSL device 324 during fourteen (14) of the SSL duty cycles 430 and the blue SSL device 326 during one (1) of the SSL duty cycles 430.

Alternatively, given the specified value of the number SSL duty cycles 430 per color slot cycle 420, such as in the previous example where each color slot cycle 420 is comprised of 16 SSL duty cycles 430, the values $t_r^G$, $t_g^G$ and $t_b^G$ can be determined directly from the binary values of the simultaneous temporal multiplexing ratios $\alpha_G$, $\beta_G$ and $\gamma_G$; respectively, using 4-bit pulse width modulation (PWM) technique.

The temporal multiplexing color slots 420 created in Level 1 during which the SSL devices 322, 324 and 326 color primaries 440 {r, g, b} would be turned on simultaneously for the temporal durations $t_r^{R,B,G}$, $t_g^{R,G,B}$ and $t_b^{R,G,B}$ would form the synthesized primaries 460 {R, G, B}, see the illustration of FIG. 4. The simultaneous temporal durations $t_r^{R,B,G}$, $t_g^{R,G,B}$ and $t_b^{R,G,B}$ would be determined by the color processing module of the hierarchical multiplexing functional block 360, and the resulting brightness of the synthesized primaries 460 {R, G, B} would be determined in the brightness module of the hierarchical multiplexing functional block 360. Detailed functional description of the temporal modulation and brightness modules of the hierarchical multiplexing functional block 360 are given below. These two modules would typically be implemented in high speed logic as part of the hierarchical multiplexing functional block 360.

Temporal Modulation Module: As explained earlier, in order to synthesize a target gamut color primaries 460 {R, G, B}, the SSL devices 322, 324 and 326 color primaries 440 {r, g, b} would be combined temporally in a ratio {$\alpha, \beta, \gamma$} so that their combined light flux produces the required target gamut color chromaticity coordinate. The equations for this temporal modulation synthesis are shown in Equations (1) below:

$$R = \alpha_R r + \beta_R g + \gamma_R b \quad (1.1)$$

$$G = \alpha_G r + \beta_G g + \gamma_G b \quad (1.2)$$

$$B = \alpha_B r + \beta_B g + \gamma_B b \quad (1.3)$$

Each of these equations is solved independently for the unknown ratio $\{\alpha, \beta, \gamma\}$ for each of the synthesized color primaries 460 $\{R, G, B\}$. In order to find the ratios $\{\alpha, \beta, \gamma\}$ for a specific color primary, for example the green target gamut primary G, equations (1.2) is used based on the chromaticity coordinates of the SSL devices 322, 324 and 326 color primaries 440 $\{r, g, b\}$. The color primaries 440 $\{r, g, b\}$ generated by the SSL devices 322, 324 and 326 would have to be combined in such a way to produce the target synthesized primaries 460 $\{R, G, B\}$ chromaticity (x, y) coordinate. For example, in order to synthesize the green target gamut primary G, the ratio of the x-coordinates of the SSL devices 322, 324 and 326, denoted by $\{r_x, g_x, b_x\}$, must sum to the green target gamut x-coordinate $G_x$. Likewise, the ratio of the y-coordinates $\{r_y, g_y, b_y\}$ must sum to the target gamut y-coordinate $G_y$. Finding these ratios requires solving the system of Equations (2) for $\{\alpha_G, \beta_G, \gamma_G\}$.

$$\alpha_G r_x + \beta_G g_x + \gamma_G b_x = G_x \quad (2.1)$$

$$\alpha_G r_y + \beta_G g_y + \gamma_G b_y = G_y \quad (2.2)$$

$$\alpha_G + \beta_G + \gamma_G = 1 \quad (2.3)$$

The ratios $\{\alpha_R, \beta_R, \gamma_R\}$ and $\{\alpha_B, \beta_B, \gamma_B\}$ for the red and blue target gamut primaries, respectively, can be found using the similar sets of equations.

When a set of SSL devices 322, 324 and 326 of equal brightness are combined temporally according to the calculated $\{\alpha, \beta, \gamma\}$ ratios as given by Equations (1), they will produce the target gamut primary chromaticity point. Since the brightness of each SSL device is likely to be different, the ratio $\{\alpha, \beta, \gamma\}$ must be scaled to account for the different in the brightness of the SSL devices 322, 324 and 326, denoted by $\{L_r, L_g, L_b\}$. For example, in order to account for the differences in the brightness of the SSL devices 322, 324 and 326 the ratios $\{\alpha_G, \beta_G, \gamma_G\}$ that result in the green target gamut primary would have to be modified in accordance with Equations (3) below.

$$\alpha_G \times \frac{L_r + L_g + L_b}{L_r} \to \alpha_G \quad (3.1)$$

$$\beta_G \times \frac{L_r + L_g + L_b}{L_g} \to \beta_G \quad (3.2)$$

$$\gamma_G \times \frac{L_r + L_g + L_b}{L_b} \to \gamma_G \quad (3.3)$$

Similar set of equations can be used for the red and blue target gamut primaries. Note that for generating the green target gamut primary G, the value $\beta_G$ will usually be much larger than $\alpha_G$ and $\gamma_G$, since G is much closer to g and much farther from r and b. Similarly for generating the red target gamut primary R, the value $\alpha_R$ will usually be much larger than $\beta_R$ and $\gamma_R$, since R is much closer to r and much farther from g and b. Similarly for generating the blue target gamut primary B, the value $\gamma_B$ will usually be much larger than $\alpha_B$ and $\beta_B$, since B is much closer to b and much farther from r and g.

As explained earlier, in order to use the temporal ratio $\{\alpha, \beta, \gamma\}$ in practice, the ratio must be converted to actual time values. This conversion would be done by normalizing ratios $\{\alpha, \beta, \gamma\}$ to the largest of the three values and then multiplying the resultant values by the size $t_{slot}$ of the color slot 420 expressed in terms of the number of SSL duty cycles 430. The result is the number of SSL duty cycles 430 within the color slot 420 that each of the SSL devices 322, 324 and 326 would have to be turned on to synthesize each of the target gamut primaries 460 $\{R, G, B\}$. For example, to synthesize the green target primary G, the simultaneous on-times duty cycles for the SSL devices 322, 324 and 326, denoted $\{t_r^G, t_g^G, t_b^G\}$, can be calculated as shown in Equations (4) below.

$$t_r^G = t_{Slot} \times \frac{\alpha_G}{\max(\alpha_G, \beta_G, \gamma_G)} \quad (4.1)$$

$$t_g^G = t_{Slot} \times \frac{\beta_G}{\max(\alpha_G, \beta_G, \gamma_G)} \quad (4.2)$$

$$t_b^G = t_{Slot} \times \frac{\gamma_G}{\max(\alpha_G, \beta_G, \gamma_G)} \quad (4.3)$$

The temporal multiplexing ratios $\{\alpha, \beta, \gamma\}$ required for the synthesis of the red R and blue B target primaries would be specified with a similar set of equations. The normalization of the simultaneous temporal multiplexing ratios $\{\alpha, \beta, \gamma\}$ to the largest of the three values as specified in Equations (4) intents to take advantage of the simultaneity of color primaries 440 $\{r, g, b\}$ in order to maximize the brightness of the display system 300. The normalization constraint set forth by Equation (2.3) would typically set the temporal multiplexing ratios $\{\alpha, \beta, \gamma\}$ such that the sum of the three ratios is set to unit value, which presupposes sequential temporal multiplexing of the color primaries 440 $\{r, g, b\}$ and in effect does not take into account the simultaneity of color primaries 440 $\{r, g, b\}$. Equations (4), on the other hand, incorporates the simultaneity of color primaries 440 $\{r, g, b\}$ by further normalizing temporal multiplexing ratios $\{\alpha, \beta, \gamma\}$ in order to modify these ratios into simultaneous temporal multiplexing ratios. As a result of the normalization of Equation (4) the relative values of each of the temporal multiplexing ratios $\{\alpha, \beta, \gamma\}$, would be scaled up such that the maximum of these ratios is set to unit value. The resultant effect of Equation (4) is that within the duration of the color slot 420 allocated to the synthesized green color primary G, for example, all of the SSL devices 322, 324 and 326 would be turned on simultaneously, albeit each at different temporal duty cycle, the native green primary g would be turned on for the full duration of the color slot 420. As a result, the combined luminous flux of all of the SSL devices 322, 324 and 326 would contribute to the resultant luminous flux of each of the synthesized primary. In comparison if the native color primaries 440 $\{r, g, b\}$ generated by the SSL devices 322, 324 and 326 are used directly in color sequential fashion, as in the case of the SSL-based projection system illustrated in FIG. 1b, then only the luminous flux of the individual the SSL devices would contribute the brightness of the display system.

In addition to increasing the attainable brightness of the display system 300, the simultaneous temporal multiplexing of native color primaries 440 $\{r, g, b\}$ described in the preceding paragraphs would result in that the SSL devices 322, 324 and 326 would be operated at high levels of duty cycle combined with a lower level of peak power in order to attain the required level of white point brightness specified by the external input 364, which in turn would result a net increase in the wall-plug efficiency of the display system 300 (SSL devices characteristically exhibit higher efficacy when operated at higher duty cycle and lower peak power levels).

The simultaneous on-times duty cycles for the SSL devices 322, 324 and 326 given by Equations (4) are interim values and, as will be explained in following discussion, would have to be adjusted to take into account the required brightness and chromaticity of the display system 300 white point based on the value specified by external input 364.

Brightness Module: In Level 2 of the hierarchical multiplexing functional block 360, the system white point would be set to the value specified by the external input 364. Level 2 is initialized when the brightness module computes the brightness of each of the synthesized target primaries 460 {R, G, B} created in Level 1. The resultant brightness of each of the three synthesized primaries 460 {R, G, B} created in Level 1, denoted by $\{L_R, L_G, L_B\}$, would be calculated using the temporal ratio $\{\alpha, \beta, \gamma\}$ set forth by Equations (3) as shown in Equations (5) below.

$$L_R = \frac{\alpha_R L_r + \beta_R L_g + \gamma_R L_b}{\max(\alpha_R, \beta_R, \gamma_R)} \quad (5.1)$$

$$L_G = \frac{\alpha_G L_r + \beta_G L_g + \gamma_G L_b}{\max(\alpha_G, \beta_G, \gamma_G)} \quad (5.2)$$

$$L_B = \frac{\alpha_B L_r + \beta_B L_g + \gamma_B L_b}{\max(\alpha_B, \beta_B, \gamma_B)} \quad (5.3)$$

Level 2: White Point Control

The same temporal modulation module used in Level 1 would also be used in Level 2, but is applied to the synthesized target gamut primaries 460 {R, G, B} instead of the SSL devices 322, 324 and 326 color primaries 440 {r, g, b}. In Level 2 instead of synthesizing three individual color primaries gamut points of the target gamut, a single white gamut point would be synthesized. As before, it is necessary to determine the proportions of the required temporal durations for the new primaries to create the desired white point. Subsequently, the same brightness computation is used to calculate the brightness of the resulting white point and hence the brightness of the display system 300.

Temporal Modulation: This is similar to the temporal modulation in Level 1, but this time the module uses the chromaticity coordinates {R, G, B} and the brightness $\{L_R, L_G, L_B\}$ of the synthesized target primaries 460. At this level, the synthesized primaries 460 would be temporally multiplexed sequentially to produce the target white point chromaticity and brightness specified by the external input 364. In order to achieve that, the contributing proportions of the SSL devices 322, 324 and 326 color primaries 440 {r, g, b} would have to be modified in such a manner that the chromaticity W of the white point, as specified by the external input 364, would be achieved.

In order to create the target white point W, the three target gamut synthesized primaries {R, G, B} 460 would have to be combined in a ratio $\{\alpha_W, \beta_W, \gamma_W\}$ so that, when temporally multiplexed sequentially, the desired white point as specified by the external input 364 is produced. Equation (6) below expresses the target white point chromaticity in terms of the synthesized gamut primaries {R, G, B}.

$$W = \alpha_W R + \beta_W G + \gamma_W B \quad (6)$$

Determining the ratios $\{\alpha_W, \beta_W, \gamma_W\}$ required to create the white point requires solving Equation (6) for the three unknowns $\{\alpha_W, \beta_W, \gamma_W\}$. Similar to the before, three equations are used based on the chromaticity coordinates of the target gamut primaries. The target gamut primaries must be combined in such a way that they produce the white point's chromaticity (x, y) coordinates. The ratio of the x-coordinates of the target gamut primaries, denoted by $\{R_x, G_x, B_x\}$, must sum to the white point's x-coordinate $W_x$. Likewise, the ratio of the y-coordinates $\{R_y, G_y, B_y\}$ must sum to the white point's y-coordinate $W_y$. Finding these ratios requires solving the system of Equations (7) for $\{\alpha_W, \beta_W, \gamma_W\}$.

$$\alpha_W R_x + \beta_W G_x + \gamma_W B_x = W_x \quad (7.1)$$

$$\alpha_W R_y + \beta_W G_y + \gamma_W B_y = W_y \quad (7.2)$$

$$\alpha_W + \beta_W + \gamma_W = 1 \quad (7.3)$$

After solving the above system of Equations (7), the resultant ratios $\{\alpha_W, \beta_W, \gamma_W\}$ would need to be scaled in order to take into account the difference in the attained brightness $\{L_R, L_G, L_B\}$ of the target gamut primaries {R, G, B} synthesized in Level 1 and given by Equations (5) as shown in Equation (8).

$$\alpha_W \times \frac{L_R + L_G + L_B}{L_R} \to \alpha_W \quad (8.1)$$

$$\beta_W \times \frac{L_R + L_G + L_B}{L_G} \to \beta_W \quad (8.2)$$

$$\gamma_W \times \frac{L_R + L_G + L_B}{L_B} \to \gamma_W \quad (8.3)$$

Once the sequential temporal multiplexing ratios $\{\alpha_W, \beta_W, \gamma_W\}$ of the synthesized target gamut {R, G, B} have been determined, using the system of Equations (7) and (8), in order to create the required target white point W (specified by the external input 364), these ratios would need to be implemented through modification of the simultaneous temporal multiplexing ratios $\{\alpha, \beta, \gamma\}$ of native color primaries {r, g, b} of the SSL devices 322, 324 and 326 created at Level 1. In order to achieve that the set of simultaneous temporal multiplexing ratios $\{\alpha, \beta, \gamma\}$ required to synthesize each of the target gamut color primaries {R, G, B} would have to be scaled by the appropriate white point ratio $\{\alpha_W, \beta_W, \gamma_W\}$ according to Equations (9) through (11).

$$\alpha_R \times \frac{\alpha_W}{\max(\alpha_W, \beta_W, \gamma_W)} \to \alpha_R \quad (9.1)$$

$$\beta_R \times \frac{\alpha_W}{\max(\alpha_W, \beta_W, \gamma_W)} \to \beta_R \quad (9.2)$$

$$\gamma_R \times \frac{\alpha_W}{\max(\alpha_W, \beta_W, \gamma_W)} \to \gamma_R \quad (9.3)$$

$$\alpha_G \times \frac{\beta_W}{\max(\alpha_W, \beta_W, \gamma_W)} \to \alpha_G \quad (10.1)$$

$$\beta_G \times \frac{\beta_W}{\max(\alpha_W, \beta_W, \gamma_W)} \to \beta_G \quad (10.2)$$

$$\gamma_G \times \frac{\beta_W}{\max(\alpha_W, \beta_W, \gamma_W)} \to \gamma_G \quad (10.3)$$

$$\alpha_B \times \frac{\gamma_W}{\max(\alpha_W, \beta_W, \gamma_W)} \to \alpha_B \quad (11.1)$$

-continued $$\beta_B \times \frac{\gamma_W}{\max(\alpha_W, \beta_W, \gamma_W)} \rightarrow \beta_B \qquad (11.2)$$

$$\gamma_B \times \frac{\gamma_W}{\max(\alpha_W, \beta_W, \gamma_W)} \rightarrow \gamma_B \qquad (11.3)$$

The set of simultaneous temporal multiplexing ratios {α, β, γ} specified by Equations (9) through (11) are the final adjusted temporal ratios required to synthesize the white point brightness and chromaticity specified by the external input 364. These final values of the simultaneous temporal multiplexing ratios {α, β, γ} would be converted into the simultaneous on-times duty cycles for each of the SSL devices 322, 324 and 326 for each of the synthesized target gamut primaries {R, G, B}, denoted by $\{t_r^R, t_g^R, t_b^R\}$, $\{t_r^G, t_g^G, t_b^G\}$ and $\{t_r^B, t_g^B, t_b^B\}$, as illustrated by Equations (4).

Brightness Module: Similar to the case of requiring knowledge of the achieved level of brightness $L_R$, $L_G$, and $L_B$ of the target gamut primaries {R, G, B} synthesized in Level 1 in order to set up Level 2, it will be necessary to know the achieved level of brightness of the white point W synthesized in Level 2 in order to set up Level 3. The brightness of the white point, denoted $L_W$, would be calculated using the sequential temporal ratios {$\alpha_W$, $\beta_W$, $\gamma_W$} and the achieved brightness of target gamut primaries, denoted {$L_R$, $L_G$, $L_B$}, as shown in Equation (12).

$$L_W = \frac{\alpha_W L_R + \beta_W L_G + \gamma_W L_B}{\max(\alpha_W, \beta_W, \gamma_W)} \qquad (12)$$

Level 3: Brightness Control

In Level 3 of the hierarchical multiplexing functional block 360 the white point brightness of the display system 300 can be continually adjusted by scaling the sequential temporal ratios {$\alpha_W$, $\beta_W$, $\gamma_W$}. The brightness $L_W$ calculated at the end of Level 2 can be scaled in order to adjust the display system 300 brightness to any desired reference brightness, denoted $L_{Ref}$, that may be subsequently specified through the external input 364. In order to achieve that, a scale factor S would have to be calculated as shown in Equation (13).

$$S = \frac{L_{Ref}}{L_W} \qquad (13)$$

Using the scale factor S specified by Equation (13), the simultaneous temporal multiplexing ratios {$\alpha_R$, $\beta_R$, $\gamma_R$}, {$\alpha_G$, $\beta_G$, $\gamma_G$}, and {$\alpha_B$, $\beta_B$, $\gamma_B$} from Level 1 would be scaled to produce the required target brightness value $L_{Ref}$. For example, Equations (14) show how the simultaneous temporal multiplexing ratios for green primary would b scaled in order to produce the required target brightness value $L_{Ref}$. The equations for the red and blue target gamut primaries are similar.

$$\alpha_G \times s \rightarrow \alpha_G \qquad (14.1)$$

$$\beta_G \times s \rightarrow \beta_G \qquad (14.2)$$

$$\gamma_G \times s \rightarrow \gamma_G \qquad (14.3)$$

As evident from the preceding description of the functional details of each of the levels of the hierarchical multiplexing functional block 360 of the display system 300 of this invention, the hierarchical multiplexing functional block 360 enables real-time control of the display system 300 gamut and white point brightness and chromaticity strictly by varying the simultaneous temporal multiplexing parameters of the of the SSL devices 322, 324 and 326 and without biasing or in any way altering the grayscale values of the image data. This capability is critical for achieving the color and brightness uniformity paramount in tiled multi-projectors display systems (see U.S. Pat. No. 7,334,901). In such systems the external inputs 363 and 364 would provided to the hierarchical multiplexing functional block 360 by external functional blocks whose functions is to first sense the color and brightness of each of the multiple projectors comprising the tiled multi-projectors display system and second to generate the inputs 363 and 364 for each projector that would attain and maintain the desired level of color and brightness uniformity across all of the multiple projectors comprising the tiled multi-projectors display system (see U.S. Pat. No. 7,334,901).

The aforementioned capability of real-time control of the display system 300 gamut and white point brightness and chromaticity enabled by the hierarchical multiplexing functional block 360 of this invention can also be used to compensate for the color and brightness drifts typically associated with operating temperature changes and aging SSL devices (see U.S. Pat. No. 7,334,901). In this type of applications a light sensor, coupled to detect the color and brightness generated by the SSL devices 322, 324 and 326 and coupled into the SLM device 310 (see U.S. Pat. No. 7,334,901), would generate the external input 362 which in turn would be used by the hierarchical multiplexing functional block 360 in order to adjust the simultaneous temporal multiplexing parameters of the SSL devices 322, 324 and 326, as explained in the preceding paragraphs, in order compensate for the changes in the color and brightness of the SSL devices 322, 324 and 326 and maintain the brightness and chromaticity of the synthesized primaries. In this case the hierarchical multiplexing functional block 360 would adjust the mapping of the native primaries of the SSL devices 322, 324 and 326 into the primaries of the target gamut specified by the external input 363 by altering the values of the simultaneous temporal multiplexing ratios {α, β, γ}, as explained earlier, in order to maintain the brightness and chromaticity of the synthesized primaries at the values specified by the external input 362.

In summary, the SSL-based projection display system 300 of this invention incorporating the hierarchical multiplexing functional block 360 which enables, through simultaneous temporal multiplexing of the SSL devices operational duty cycles in synchronism with temporal operation of the SLM device 310, the following operational and performance advantages:

1. The ability to synthesize any desired target gamut comprised of multiple synthesized primaries that are fully contained within the native gamut formed by the color primaries of the SSL devices;

2. The ability to selectively incorporate within the synthesized gamut a white primary and/or a black primary in order to improve the display system color saturation and contrast levels;

3. The ability to selectively interleave the temporal slot allocations of the synthesized primaries in order to reduce the projection image speckle and artifacts that could be caused by contiguity sequential temporal slot of the same color primary;

4. The ability of real-time control of the mapping from the native gamut of the SSL devices to the target synthesized gamut in order to compensate for possible variations in the native gamut of the SSL devices and maintain the stability of the target gamut brightness and chromaticity;

5. The ability to synthesize any desired target white point brightness and chromaticity without biasing or altering the image data grayscale values;

6. The ability of real-time control of the display system white point brightness and chromaticity strictly by varying the simultaneous temporal multiplexing of the SSL devices operational duty cycles and without biasing or altering the image data grayscale values;

7. The ability to achieve higher level of brightness and wall-plug efficiency than display systems that uses SSL based on a conventional color sequential scheme; and 8. The ability to achieve higher contrast, dynamic range, wall-plug efficiency, and overall brightness than display systems, whether lamp based or SSL based, that depend on manipulating the image grayscale values to adjust its gamut or color point characteristics.

In the forgoing detailed description, the present invention has been described with reference to specific embodiments thereof. It will, however, be evident that various modifications and changes can be made thereto without departing from the broader spirit and scope of the invention. The design details and drawings are, accordingly, to be regarded in an illustrative rather than a restrictive sense. Skilled persons will recognize that portions of this invention may be implemented differently than the implementation described above for the preferred embodiment. For example, skilled persons will appreciate that the SSL-based Projection Display System 300 of this invention incorporating the hierarchical multiplexing functional block 360 can be implemented with numerous variations to the number of SSL devices used, the number color primaries associated with the SLL devices used, the specific design details of the projection optics 340, the specific details of the illumination optics 330, the specific design details of the PWM conversion block 390 and its interface with the SLM device 310, the specific implementation details of the hierarchical multiplexing functional block 360 and the specific design details of the coupling of the external interfaces 362, 363 and 364. Skilled persons will further recognize that many changes may be made to the details of the aforementioned embodiment of this invention without departing from the underlying principles thereof. The scope of the present invention should, therefore, be determined only by the following claims.

What is claimed is:

1. A solid state light based projection display system comprising: plurality of pixel illuminating devices to illuminate a plurality of pixels in each of a plurality of color slots, each pixel having digitally controllable on/off states, the pixel illuminating devices using solid state light sources; projection optics optically coupled to magnify an image generated by the plurality of digitally controllable pixels; a pulse width modulation (PWM) block coupled to the pixel illuminating devices to control the on/off states of each of the digitally controllable pixels and a hierarchical multiplexing functional block coupled to receive digital image data and a multiplicity of other external inputs and to provide control and synchronization sisals to the plurality of pixel illuminating devices and the PWM modulation functional block to cause the plurality of digitally controllable pixels to generate an image responsive to the image data; wherein the hierarchical multiplexing functional block carries out three levels of processing whereby; in the first processing level, referred to as gamut control level, simultaneous on/off duty cycles of each of the pixel illuminating devices required to synthesize a target gamut are computed by mapping chromaticity and brightness values of native color primaries of the SSL devices, provided by an external input, to chromaticity and brightness values of target gamut color primaries, provided by an external input; in the second processing level, referred to as white point control level, the simultaneous on/off duty cycles of the pixel illuminating devices computed in the first processing level are modified to incorporate the chromaticity and brightness values of the required white point provided by an external input; and, in the third processing level, referred to as brightness control level, the simultaneous on/off duty cycles of the pixel illuminating devices computed in the second processing level are further modified to incorporate adjustments in brightness of the display system white point provided by an external input.

2. The solid state light based projection display of claim 1 wherein the hierarchical multiplexing functional block is coupled to accept an externally provided image frame cycle signal and generate two lower tier synchronization signals, a first conveying timing of color slots comprising the image frame cycle, and a second conveying timing of simultaneous on/off duty cycles of the digitally controllable pixels in each of the plurality of color slots.

3. The solid state light based projection display system of claim 2 wherein the plurality of pixel illuminating devices provide a multiplicity of light color primaries for each pixel, each pixel illuminating device being electrically coupled to receive a temporal control signal for temporal control of the on/off state of each pixel of the pixel illuminating device in each color slot in synchronism with the timing of the respective on/off duty cycle.

4. The solid state light based projection display system of claim 3 wherein the pixel illuminating devices operate simultaneously for different light color primaries and at different on/off duty cycles during different color slot cycles.

5. The solid state light based projection display system of claim 4 wherein the hierarchical multiplexing functional block computes the simultaneous on/off duty cycles during each of the plurality of color slots of each of the pixel illuminating devices light color primaries required to synthesize a target white point.

6. The solid state light based projection display system of claim 2 wherein the pulse width modulation (PWM) block is coupled to receive 1-bit fields specifying each image pixel on/off state, a color slot synchronization signal and a digital control word specifying the number of color slot cycles to apply to the image pixel on/off state 1-bit fields to control the digitally controllable pixels.

7. The solid state light based projection display system of claim 6 wherein:

the plurality of pixel illuminating devices each provide one of a multiplicity of light color primaries, each pixel illuminating device being electrically coupled to receive a temporal control signal for temporal control of the on/off state of each pixel illuminating device in each color slot in synchronism with the timing of the respective on/off duty cycle; and, the hierarchical multiplexing functional block being coupled to provide the pixel illuminating devices with the on/off state temporal control signal in synchronism with providing the pulse width modulation (PWM) functional block with 1-bit fields specifying the on/off state of each of the digital image pixels and the digital control word specifying the number of color slot cycles to apply the conveyed 1-bit fields data.

8. The solid state light based projection display system of claim 2 wherein:

the plurality of pixel illuminating devices provide a multiplicity of light color primaries, each pixel illuminating device being electrically coupled to allow temporal control of the on/off duty cycles of the pixel illuminating devices in each color slot in synchronism with the timing of the respective on/off duty cycle;

wherein the hierarchical multiplexing functional block is coupled to accept an external signal specifying brightness and chromaticity (solid state light source gamut) of each of the light color primaries generated by the plurality of pixel illuminating devices;

to accept an external signal specifying the brightness and chromaticity of color primaries defining a target gamut for the display system; and to accept an external signal specifying the brightness and chromaticity of a target white point for the display system.

9. The solid state light based projection display system of claim 8 wherein the solid state light sources have a solid state light source gamut, and wherein the target gamut is fully contained within the solid state light source gamut.

10. The solid state light based projection display system of claim 8 wherein the target gamut is either the NTSC or HDTV display systems gamut standards.

11. The solid state light based projection display system of claim 8 wherein:

the plurality of pixel illuminating devices provide a multiplicity of light color primaries, each pixel illuminating device being electrically coupled to allow temporal control of the on/off state of each pixel illuminating device in each of a plurality of color slots in synchronism with the timing of the respective on/off duty cycle; and, wherein the hierarchical multiplexing functional block is coupled to compute the simultaneous on/off duty cycles during each of the color slots of each of the light color primaries generated by the plurality of pixel illuminating devices required to synthesize each of the color primaries defining the target gamut.

12. The solid state light based projection display system of claim 11 wherein the hierarchical multiplexing functional block allocates within each image frame cycle a number of color slots to each of the synthesized color primaries.

13. The solid state light based projection display system of claim 12 wherein:

wherein the pulse width modulation (PWM) block is coupled to receive 1-bit fields specifying each image pixel on/off state, a color slot synchronization signal and a digital control word specifying the number of color slot cycles to apply the image pixel on/off state 1-bit fields to control the states of each of the pixels; and, wherein the allocated number of color slots conveys the value of the multiple bit words of each of the image pixel's grayscale values in the digital image data using the 1-bit fields.

14. The solid state light based projection display system of claim 8 wherein the color slots are comprised of a number of the pixel illuminating device on/off duty cycles to synthesize the target gamut color primaries.

15. The solid state light based projection display system of claim 8 wherein:

the hierarchical multiplexing functional block interleaves the color slots allocated to the target gamut color primaries to reduce the temporal speckle that would be caused by excessive temporal contiguity of color slots allocated to the same synthesized color primary.

16. The solid state light based projection display system of claim 8 wherein:

the pulse width modulation (PWM) block is coupled to receive 1-bit fields specifying each image pixel on/off state, a color slot synchronization signal and a digital control word specifying the number of color slot cycles to apply the image pixel on/off state 1-bit fields to control the reflective states of each of the pixels; and the hierarchical multiplexing functional block inserts a black primary by turning off all of the pixel illuminating devices during the color slots allocated to any of the synthesized color primaries associated with 1-bit fields comprising a zero value for each of the image pixels.

17. The solid state light based projection display system of claim 1 wherein the hierarchical multiplexing functional block is comprised of two processing modules whereby: in the first processing module of each level, referred to as the temporal modulation module, the simultaneous on/off duty cycles of the pixel illuminating devices required to synthesize the target gamut are computed; and in the second processing module, referred to as the brightness module, the computed simultaneous on/off duty cycles of the pixel illuminating devices are modified to synthesize the display system white point brightness.

18. The solid state light based projection display system of claim 1 wherein: the hierarchical multiplexing functional block carries out the three levels of processing, each processing level being level independent in controlling only one property of the display system, either target gamut, white point or brightness; each of the second and third processing levels are invariant by not altering the properties of the display system that have been set at a higher processing level: and each processing level is processing invariant with each of the processing levels using the same two processing modules, but with different inputs to impact different properties of the display system.

19. The solid state light based projection display system of claim 1 wherein the hierarchical multiplexing functional block carries out the three levels of processing wherein the gamut control and white point control levels each maximize the brightness of the display system by scaling up the computed simultaneous on/off duty cycles of the pixel illuminating devices such that the largest of these on/off duty cycles is set to maximum value for the solid state light based projection display system.

20. The solid state light (SSL) based projection display system of claim 1 wherein the processing levels enable control of the display system gamut and white point brightness and chromaticity only by adjusting the on/off duty cycles of the pixel illuminating devices and without biasing or altering the image data gray scale values.

21. The solid state light based projection display system of claim 1 wherein, because of operating the pixel illuminating devices at higher on/off duty cycles, the processing levels enable the solid state light based projection display system to achieve higher levels of brightness and wall-plug efficiency than display systems that use solid state light devices directly in a color sequential fashion.

22. The solid state light based projection display system of claim 1 wherein the pixel illuminating devices include solid state light sources and an imaging device of the reflective type, comprised of either a plurality of micro mirrors or a plurality of liquid crystal cells, coupled for temporal control of the reflective state of each of its pixels.

23. The solid state light based projection display system of claim 1 wherein the color primaries defining a target gamut include at least red, green, blue cyan, magenta, and yellow.

24. The solid state light based projection display system of claim 1 wherein:

the plurality of pixel illuminating devices provide a multiplicity of light color primaries, each pixel illuminating device being electrically coupled to allow temporal control of an on/off state of each pixel illuminating device in each of a plurality of color slots in synchronism with the timing of the respective on/off duty cycle; and, the hierarchical multiplexing functional block is coupled to accept an externally provided image frame cycle signal and generate two lower tier synchronization signals, a first conveying the timing of color slots comprising the image frame cycle, and a second conveying the timing of simultaneous on/off duty cycles of the pixel illuminating devices in each of the plurality of color slots, and to compute the simultaneous on/off duty cycles during each of the color slots of each of the light color primaries generated by the plurality of pixel illuminating devices required to synthesize each of the color primaries defining the target gamut; and the hierarchical multiplexing functional block computes the simultaneous on/off duty cycles during each of the plurality of color slots of each of the pixel illuminating device light color primaries required to synthesize the target white point; and, the hierarchical multiplexing functional block allocates a number of the color slots during the image frame cycle to a synthesized target white point sufficient to allow control of the saturation level of each of the synthesized target color primaries.

25. The solid state light based projection display system of claim 1 used in multiplicity in a multi-projector array (tiled) display system to achieve color and brightness uniformity across the displayed image.

26. The solid state light based projection display system of claim 1 wherein the hierarchical multiplexing functional block compensates for the pixel illuminating device color and brightness drifts associated with operating temperature changes and aging of the pixel illuminating devices responsive to an external input signal.

27. In a solid state light based projection display system having a plurality of pixel illuminating devices to illuminate a plurality of pixels in each of a plurality of color slots, each pixel having digitally controllable on/off states, the pixel illuminating devices using solid state light sources, and projection optics optically coupled to magnify an image generated by the plurality of digitally controllable pixels, the method comprising:

in a first processing level, referred to as gamut control level, computing simultaneous on/off duty cycles of each of the pixel illuminating devices required to synthesize a target gamut by mapping chromaticity and brightness values of native color primaries of the pixel illuminating devices, provided by an external input, to chromaticity and brightness values of the target gamut color primaries, provided by an external input;

in a second processing level, referred to as white point control level, modifying the simultaneous on/off duty cycles of the pixel illuminating devices computed in the first processing level to incorporate the chromaticity and brightness values of the required white point provided by an external input; and, in a third processing level, referred to as brightness control level, modifying the simultaneous on/off duty cycles of the pixel illuminating devices computed in the second processing level to incorporate adjustments in brightness of the display system white point provided by an external input.

28. The method of claim 27 wherein:

each processing level is level independent in controlling only one property of the display system, either target gamut, white point or brightness;

each of the second and third processing levels are level invariant by not altering the properties of the display system that have been set at a higher processing level: and each processing level is processing invariant with each of the processing levels using the same two processing modules, but with different inputs to impact different properties of the display system.

29. The method of claim 28 wherein:

in the first processing module of each level, referred to as the temporal modulation module, the simultaneous on/off duty cycles of the pixel illuminating devices required to synthesize the target gamut are computed; and in the second processing module, referred to as the brightness module, the computed simultaneous on/off duty cycles of the pixel illuminating devices are modified to synthesize the display system white point brightness.

30. The method of claim 27 wherein the gamut control and white point control levels each maximize the brightness of the display system by scaling up the computed simultaneous on/off duty cycles of the pixel illuminating devices such that the largest of these on/off duty cycles is set to a maximum value for the solid state light based projection display system.

* * * * *